US005509584A

United States Patent [19]

Gueret

[11] Patent Number: 5,509,584

[45] Date of Patent: Apr. 23, 1996

[54] HEAD FOR DISPENSING A PRODUCT, PARTICULARLY A PASTY PRODUCT, AND DISPENSER EQUIPPED WITH THIS HEAD

[75] Inventor: Jean-Louis H. Gueret, Paris, France

[73] Assignee: L'Oreal, Paris, France

[21] Appl. No.: 253,178

[22] Filed: Jun. 2, 1994

[30] Foreign Application Priority Data

Jun. 7, 1993 [FR] France .................................. 93 06764

[51] Int. Cl.$^6$ .............................. B67D 5/40; G01F 11/00

[52] U.S. Cl. ........................................ 222/321.7; 222/207

[58] Field of Search ............................ 222/321.1, 321.6, 222/321.7, 321.9, 383.1, 385, 95, 105, 207, 212

[56] References Cited

U.S. PATENT DOCUMENTS

| | | | |
|---|---|---|---|
| 4,817,829 | 4/1989 | Fuchs et al. | 222/321.7 X |
| 4,899,913 | 2/1990 | Ruscitti et al. | 222/385 |
| 5,064,102 | 11/1991 | Montaner | 222/321.9 X |
| 5,100,027 | 3/1992 | Gueret | 222/105 |
| 5,154,328 | 10/1992 | Gueret | 222/207 X |
| 5,237,797 | 8/1993 | Varlet . | |
| 5,271,532 | 12/1993 | Jumel et al. | 222/385 X |
| 5,277,340 | 1/1994 | Van Brocklin | 222/385 X |
| 5,292,033 | 3/1994 | Gueret | 222/321.7 X |
| 5,343,901 | 9/1994 | Meshberg | 222/105 X |

FOREIGN PATENT DOCUMENTS

| | | | |
|---|---|---|---|
| 0453357 | 10/1991 | European Pat. Off. . | |
| 0499538 | 8/1992 | European Pat. Off. . | |
| 567369 | 10/1993 | European Pat. Off. | 222/321.1 |
| 571280 | 11/1993 | European Pat. Off. | 222/321.1 |
| 2668119 | 4/1992 | France . | |
| 2669244 | 5/1992 | France . | |
| 91014630 | 10/1991 | WIPO | 222/95 |

*Primary Examiner*—Kevin P. Shaver
*Attorney, Agent, or Firm*—Young & Thompson

[57] ABSTRACT

The head (1) for dispensing a product, comprises a nozzle piece (2) intended to be placed on a container (5) containing the product to be dispensed. This nozzle piece (2) includes a base (4) equipped with a sleeve (6) in which is fastened, by snap-fitting, a component (11) to which a pump (14) is linked. A seal (8) is provided between the nozzle piece (2) and the component (11) in order to interact when this component (11) has been snap-fitted on the sleeve (6) of the nozzle piece. The nozzle piece includes a retainer (R) capable of holding the above-mentioned component in a pre-snap-fitting position in which the seal (8) between component and nozzle piece do not yet interact. A passage (16) is provided between the outer surface of the component (11) and the inner surface of the sleeve (6) in which the component is engaged in the pre-snap-fitting position in order to maintain communication between the inside of the container (5) and the outside, in this pre-snap-fitting position.

8 Claims, 2 Drawing Sheets

HEAD FOR DISPENSING A PRODUCT, PARTICULARLY A PASTY PRODUCT, AND DISPENSER EQUIPPED WITH THIS HEAD

The invention relates to a head for dispensing a product, of that type which comprises a nozzle piece intended to be placed on a container containing the product to be dispensed, this nozzle piece including a base equipped with a sleeve in which is fastened, by snap-fitting, a component to which a pump is linked, sealing means being provided between the nozzle piece and the component in order to interact when this component has been snap-fitted on the sleeve of the nozzle piece.

A head of this type is known from FR-A-2,669,244 which provides, in particular, a transfer component capable of being snap-fitted into the sleeve of the nozzle piece, whilst the pump is crimped on the transfer component. The container containing the product to be dispensed consists of a flexible pouch on which the nozzle piece is placed. With liquids, this head makes it possible to fill the pouch and then to snap-fit the transfer component virtually without introducing air into the pouch.

Experience has shown that the use of such a head for viscous products, particularly pasty products, is not as satisfactory as in the case of liquid products. In fact, viscous products generally contain air and, moreover, filling of the container, particularly of the pouch, with the viscous product, is virtually inevitably accompanied by a trapping of air pockets or "air prisoners" which are prejudicial to subsequent use.

The object of the invention, above all, is to provide a head for dispensing a product, of the type defined above, which makes it possible to fill the container, particularly with a viscous or pasty product, minimizing or preferably eliminating the "air prisoners".

According to the invention, a head for dispensing a product, of the type defined above, is characterized in that the nozzle piece includes retention means capable of holding the abovementioned component in a pre-snap-fitting position in which the sealing means between component and nozzle piece do not yet interact and in that passage means are provided between the outer surface of the component and the inner surface of the sleeve in which the component is engaged in the pre-snap-fitting position in order to maintain a communication between the inside of the container and the outside, in this pre-snap-fitting position.

Under these conditions, for filling, it is possible to maintain the product of the container under vacuum while the component is in the pre-snap-fitting position, by virtue of the passage means provided for this purpose. The component may be snap-fitted without delay, immediately after having created the vacuum.

The sealing means may comprise a sealing lip forming a cylindrical skirt coaxial with the nozzle piece, provided at the centre of the base of the nozzle piece around a passage opening, this lip being capable of being pressed in a leaktight manner against the inner cylindrical surface of the component when the latter is snap-fitted on the nozzle piece, the retention means advantageously being capable of holding the component in a pre-snap-fitting position such that the lower edge of the component is above the upper edge of the sealing lip.

The retention means may comprise a peripheral bead provided on the inner wall of the sleeve of the nozzle piece capable of retaining the lower edge of the component in the pre-snap-fitting position, the crossing of this bead being possible by exerting a sufficient force.

Generally, the abovementioned component has a cylindrical shape capable of matching the inner surface of the sleeve, itself cylindrical, and the passage means are arranged in order to determine longitudinal channels between the said surfaces, ensuring communication between the inside of the container and the outside when the component is in the pre-snap-fitting position.

The abovementioned passage means may comprise longitudinal grooves provided on the outer surface of the component, parallel to the generatrices of this component, the length being sufficient for their upper end to be above the upper edge of the sleeve of the nozzle piece when the component is in the pre-snap-fitting position.

The abovementioned component may be a transfer component independent of the pump body which is fastened on the said component, particularly by crimping.

As a variant, the component may form an integral part of the pump body and consist of a cylindrical skirt which is snap-fitted directly into the sleeve of the nozzle piece.

The invention also relates to a product dispenser, particularly for a pasty product, equipped with a head as defined above.

Leaving aside the arrangements set forth above, the invention consists of a number of other arrangements which will be discussed in greater detail below with reference to illustrative embodiments described with reference to the appended drawings, these embodiments not being, however, limiting in any way.

FIG. 1 of these drawings is a view in partial axial section, with exterior parts, of a dispenser head according to the invention, while the component on which the pump is fastened is in the pre-snap-fitting position.

Figure 2:
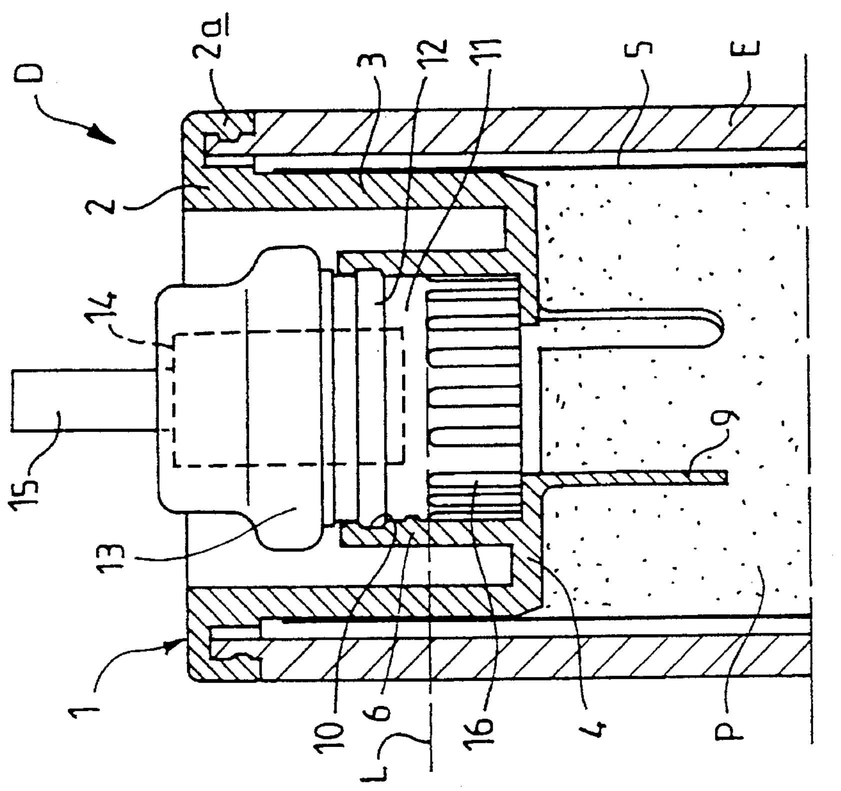
FIG. 2 shows, in a similar manner to FIG. 1, the head for a dispenser after snap-fitting of the component carrying the pump.
Figure 4:
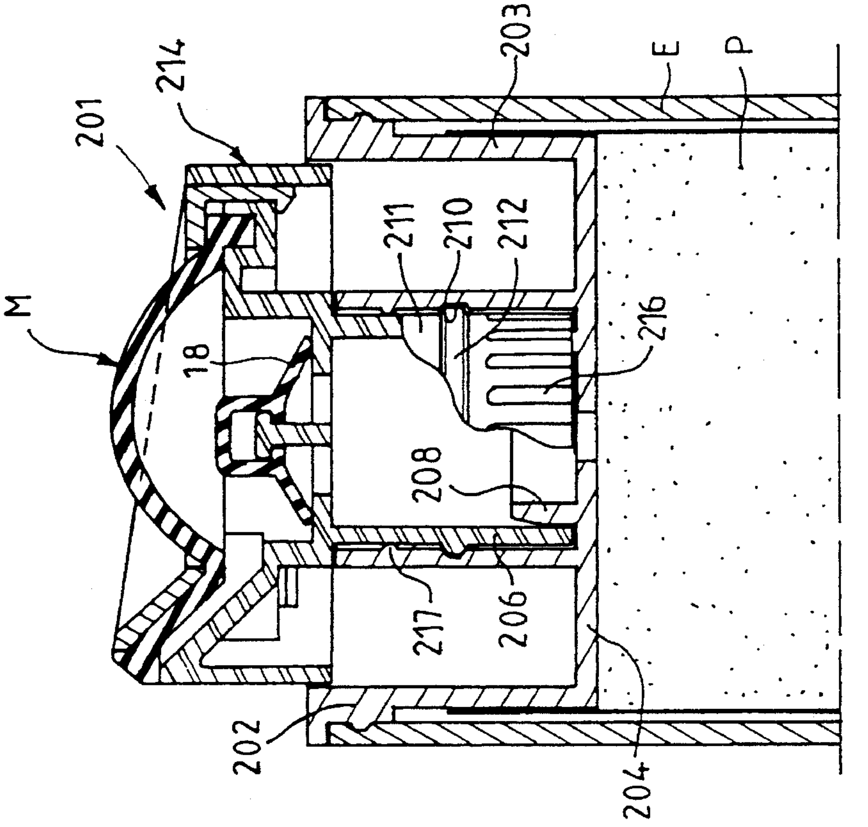

Finally, FIG. 4 shows, in a similar manner to FIG. 2, a head for a dispenser in which the component snap-fitted into the sleeve of the nozzle piece forms an integral part of the body of a membrane pump.

Figure 1:
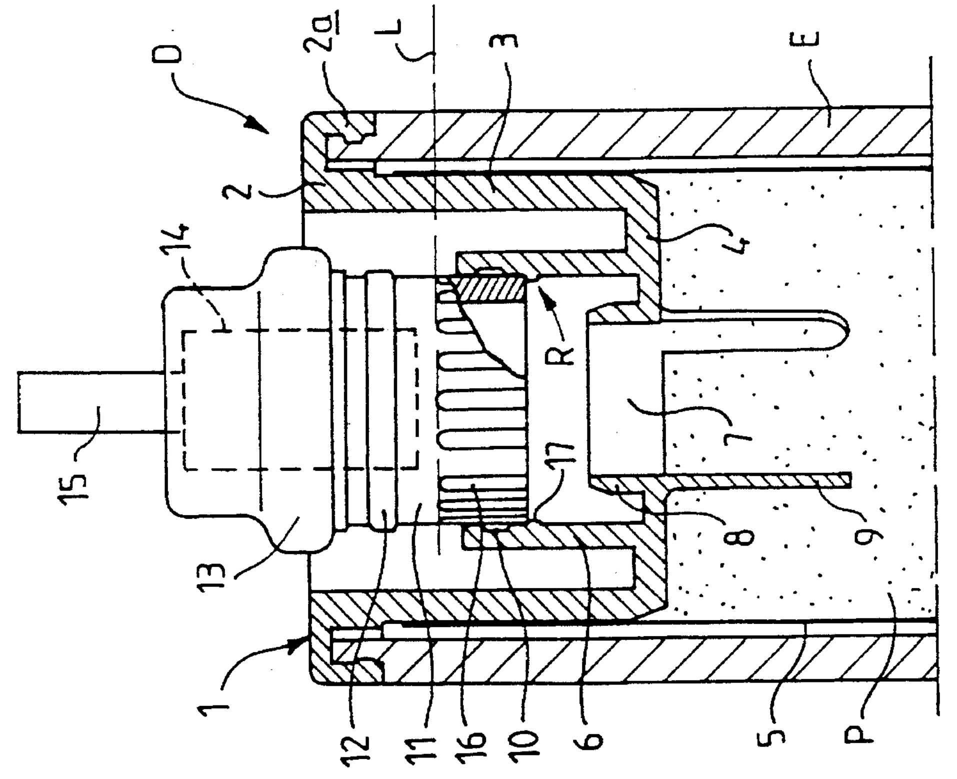

With reference to FIGS. 1 and 2 of the drawings, it is possible to see a head 1 for a dispenser D of pasty product P, for example a cream.

The head 1 comprises a nozzle piece 2 in the form of a small dish, comprising a cylindrical wall 3 and a transverse base 4. The nozzle piece is placed on a container 5 consisting of a flexible pouch. The greater part of the wall 3 is slipped in the pouch 5 and fastened in a leaktight manner, for example by welding.

The base 4 is equipped with a cylindrical sleeve 6 projecting into the small dish. An opening 7 is provided in the central part of the base 4, surrounded by the sleeve.

This opening 7 is surrounded by a sealing lip 8 forming a cylindrical skirt coaxial with the sleeve 6 and projecting into the small dish. On the side opposite the lip 8, the base 4 includes tabs 9 projecting downwards, distributed over the periphery of the opening 7, playing an anti-prisoner role, that is to say preventing the bonding of the faces of the pouch 5 against each other when the product is removed.

The sleeve 6 includes, on its inner surface, in the vicinity of its upper end, a groove 10 intended for a snap-fitting fastening of a component 11 including a snap-fitting rib 12 capable of interacting with the groove 10. The component 11 has the shape of a cylinder of revolution, the external diameter of which is equal to the internal diameter of the sleeve 6. When the component 11 is snap-fitted in the sleeve 6, as illustrated in FIG. 2, the lip 8 is pressed in a leaktight manner against the inner wall of the component 11. This component 11, in the example of FIGS. 1 and 2, is a transfer component on which a pump 14, equipped with a tubular actuating rod 15, is crimped over a border 13. On its outer surface, the component 11 includes channels or striations 16 parallel to the generatrices, distributed over the entire periphery and extending from the lower edge of the component 11 to a line L located below the snap-fitting rib 12.

On its inner wall, the sleeve 6 includes a retention means R consisting of a peripheral bead 17 located below the groove 10. This bead 17 is capable of interacting with the lower edge of the component 11, as illustrated in FIG. 1, in order to retain this component in a pre-snap-fitting position. The axial length of the channels 16 is chosen so that the line L, of the upper ends of the channels 16, is located above the upper edge of the sleeve 6 so that communication remains between the inside of the pouch 5 and the outside, in this pre-snap-fitting position, via the said channels 16.

As a variant, the passage means between the inside of the pouch 5 and the outside, in the case of this pre-snap-fitting position, may comprise channels on the inner surface of the sleeve 6 or ribs on the outer surface of the component 11 and/or the inner surface of the sleeve 6.

The bead 17 has a reduced radial dimension so that it can be crossed by the lower edge of the component 11 for snap-fitting, if a sufficient thrust force is exerted.

The upper end of the nozzle piece 2 includes a rim **2*a* capable of catching over the end of a rigid cylindrical casing E serving to protect the flexible pouch 5**.

The pouch 5 is filled as follows.

After having equipped the pouch 5 with the nozzle piece 2, devoid of the component 11, the pouch 5 is filled with product P via the opening 7.

This filling operation may take place under vacuum or in the free air. At the end of filling, atmospheric pressure is restored (if the operation has taken place under vacuum) and the component 11 is installed in the pre-snap-fitting position, as illustrated in FIG. 1, the lower edge of the component 11 abutting against the bead 17. The assembly is placed under vacuum so that the air which may have remained trapped in the product P is discharged by passing via the channels or striations 16. When a sufficient vacuum has been established, the component 11 is snap-fitted by being pressed into the sleeve 6 until the rib 12 enters the channel 10 and atmospheric pressure is restored.

The invention makes it possible to fill the pouch 5 with pasty product in a correct manner with respect to functioning and compatibility tests.

Figure 3:
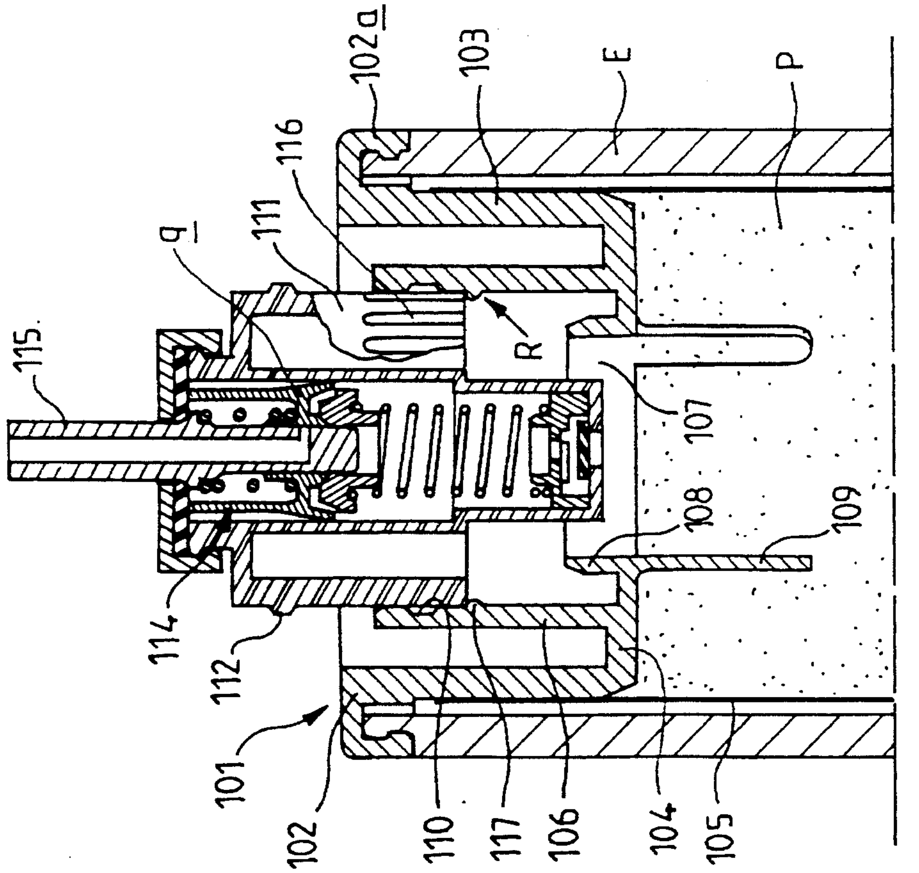
FIG. 3 shows, in a similar manner to FIG. 1, a variant embodiment in which the component intended to be snap-fitted on the nozzle piece forms an integral part of the body of a piston pump.

With reference to FIG. 3, it is possible to see a variant embodiment according to which the component 111, intended to be snap-fitted in the sleeve 106, forms an integral part of the body of the pump 114 which is of the piston type q.

The elements in this FIG. 3 which are identical or have roles similar to elements already described with reference to FIG. 1 are denoted by numerical references equal to the sum of the number 100 and the reference used in FIGS. 1 and 2.

FIG. 4 shows another variant embodiment in which the component 211, shown in the snap-fitted position in the sleeve 206, forms an integral part of the body of a pump 214 with a membrane M, equipped with a valve 18 made from elastomer material.

The various elements of the dispenser in FIG. 4 which have roles similar to elements already described with reference to FIGS. 1 and 2 are denoted by numerical references equal to the sum of the number 200 and the references used in FIGS. 1 and 2, without being further described.

Regardless of the embodiment, the invention makes it possible to fill the flexible pouch 5, 105, 205 under vacuum without creating "air prisoners" and to snap-fit the component 11, 111, 211 from its pre-snap-fitting position, just after having created the vacuum.

Naturally, in case of FIGS. 3 and 4, a transfer piece independent of the pump body, which would be fastened particularly by crimping, could be provided on this transfer component.

I claim:

1. Head for dispensing a product, comprising a nozzle piece adapted to be placed on a container (5, 105, 205) containing the product to be dispensed, this nozzle piece including a base (4, 104, 204) equipped with a sleeve (6, 106, 206) in which is fastened a component to which a pump (14, 114, 214) is linked, sealing means between the nozzle piece (2, 102, 202) and the component (11, 111, 211) in order to interact when this component has been fully seated on the sleeve of the nozzle piece, the nozzle piece (2, 102, 202) having retention means (R) capable of holding the component (11, 111, 211) in an only partially seated position in which the sealing means (8, 108, 208) between the component and nozzle piece do not yet interact, and passage means (16, 116, 216) between an outer surface of the component (11, 111, 211) and an inner surface of the sleeve (6, 106, 206) in which the component is engaged in the partially seated position in order to maintain a communication between the inside of the container (5, 105, 205) and the outside in only the partially seated position.

2. Head according to claim 1, wherein the sealing means comprise a sealing lip (8, 108, 208) forming a cylindrical skirt coaxial with the nozzle piece, provided at the center of the base (4, 104, 204) of the nozzle piece (2, 102, 202) around a passage opening (7, 107, 207), this lip (8, 108, 208) being adapted to be pressed in a leaktight manner against an inner cylindrical surface of the component (11, 111, 211) when the latter is fully seated on the nozzle piece, the retention means (R) being adapted to hold the component in said partially seated position such that a lower edge of the component is above the sealing lip (8, 108, 208).

3. Head according to claim 2, wherein the retention means (R) comprise a peripheral bead (17, 117, 217) provided on said inner surface of the sleeve (6,106, 206) of the nozzle piece adapted to retain said lower edge of the component (11, 111, 211) in the partially seated position, crossing of this bead being possible by exerting a sufficient force.

4. Head according to claim 1, in which the component (11, 111, 211) has a cylindrical shape matching said inner surface of the sleeve, the passage means (16, 116, 216) defining longitudinal channels between the said surfaces, ensuring communication between the inside of the container (5, 105, 205) and the outside when the component (11, 111, 211) is in the partially seated position.

5. Head according to claim 4, wherein the passage means comprise longitudinal grooves (126, 116, 216) provided on said outer surface of the component (11, 111, 211), parallel to generatrices of this component, the length of these grooves (16, 116, 216) being sufficient for upper ends of the grooves to be above an upper edge of the sleeve (6, 106, 206) of the nozzle piece when the component (11, 111, 211) is in the partially seated position.

6. Head according to claim 1, wherein the component (11) is independent of a pump body which is fastened on the said component by crimping.

7. Head according to claim 1, wherein the component (11, 111, 211) forms an integral part of a pump body and consists of a cylindrical skirt which fits into the sleeve (106, 206) of the nozzle piece.

8. Product dispenser comprising in combination a container, and on the container, a head (1) according to claim 1.

* * * * *